Dec. 8, 1931.  B. H. BROWALL  1,835,008
AUTOMATIC SLACK ADJUSTER FOR BRAKES
Filed May 16, 1929  3 Sheets-Sheet 2
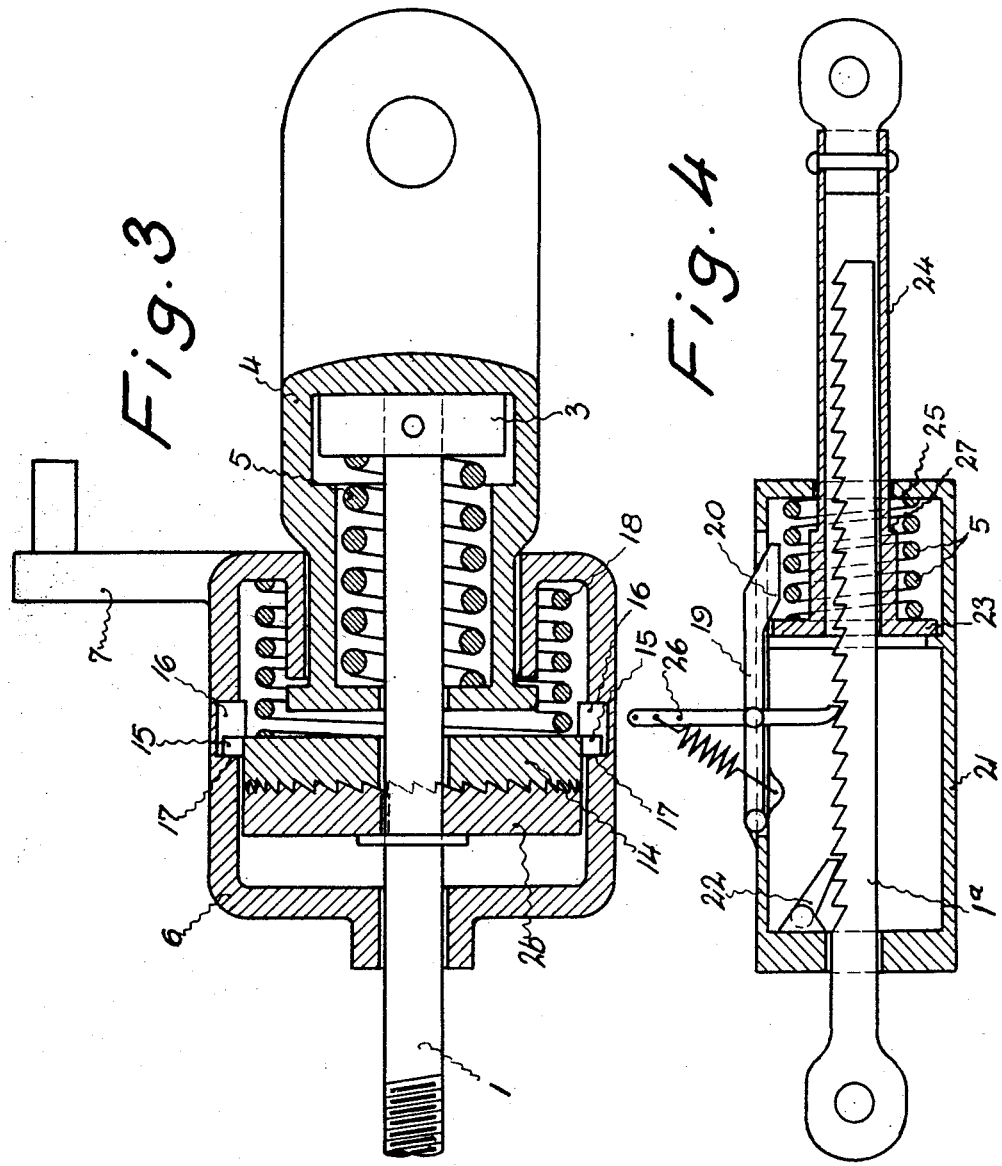
Inventor:
Bert Henry Browall
By [signature]
Attorney.

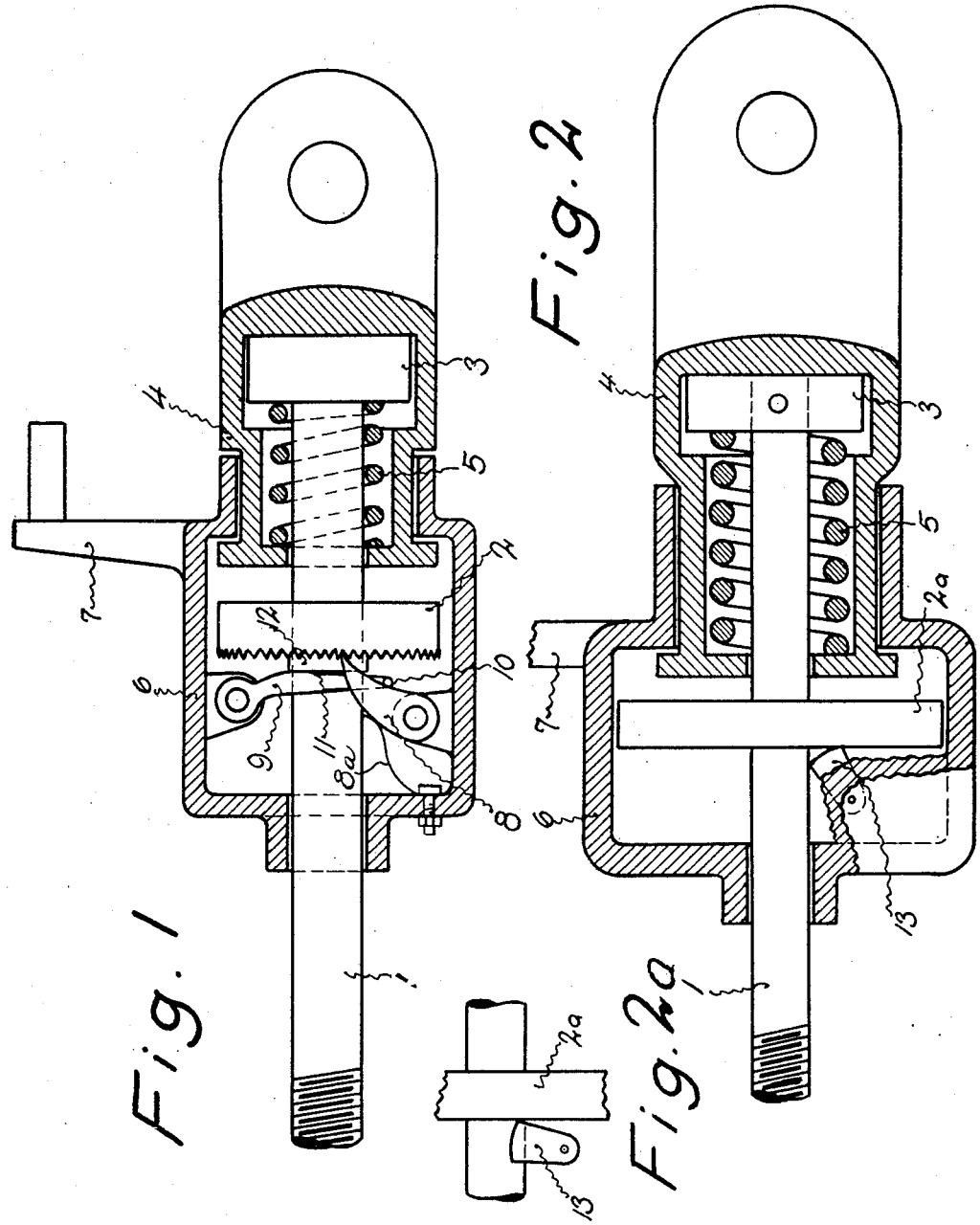

Patented Dec. 8, 1931

1,835,008

UNITED STATES PATENT OFFICE

BERT HENRY BROWALL, OF MALMO, SWEDEN, ASSIGNOR TO SVENSKA AKTIEBOLAGET BROMSREGULATOR, OF MALMO, SWEDEN, A CORPORATION OF SWEDEN

AUTOMATIC SLACK ADJUSTER FOR BRAKES

Application filed May 16, 1929, Serial No. 363,492, and in Germany May 21, 1928.

The present invention refers to an improvement in automatic slack adjusters for brakes on railway cars and the like, and more specifically to apparatus of this kind, in which the inter-distance between the brake shoes and the wheels is controlled by means of a spindle or rod which, at the application of the brakes, is displaceable in the direction of its length by means of a driving device acting in one direction only, the influence of such one-way driving device on the spindle or rod ceasing when the stress, arising in the brake rigging during braking, has reached a certain predetermined value.

In order that the influence of the one-way driving device on the spindle or rod will cease at the predetermined moment, it has previously been proposed to use a screw spindle, the displacement of which is obtained by the turning of the same, and to provide the slack adjuster, besides the one-way driving device mentioned above, with a releasable clutch by means of which the adjusting power is transmitted to the adjuster spindle, whereby the release of the clutch is performed by means of the stress arising in the brake rigging when braking, the one-way driving device being then permanently in engagement.

An arrangement of this kind involves, however, unnecessary complications in constructional respects, and the main object of the invention is to eliminate such complications. The principle of the invention to be found therein is that the apparatus, without the assistance of any releasable clutch, is put out of action by means of the stress arising when braking, whereby such stress is utilized for disengagement of the one-way driving device itself.

A similar arrangement may also be used in slack adjusters provided with an adjusting rod which is directly displaceable in its direction of length without turning of the same, as will be further disclosed in the following.

The invention is illustrated in the accompanying drawings, in which

Fig. 1 shows an embodiment of the invention, in which the one-way driving device consists of a pawl and ratchet mechanism.

Figs. 2 and 2ª show another embodiment of the invention wherein the driving device is carried out in the form of a one-way friction pawl and disc mechanism; the pawl being shown in operative and inoperative position, respectively, in these two views.

Fig. 3 shows a third embodiment provided with a driving device consisting of two coacting ratchet wheels forming a one-way clutch.

Fig. 4 shows a fourth embodiment of the invention, according to which the same principle is applied to a slack adjuster provided with a directly displaceable rod instead of a turnable spindle, all four figures being views in longitudinal section.

In all of the figures the same reference characters indicate corresponding parts.

Figure 5:
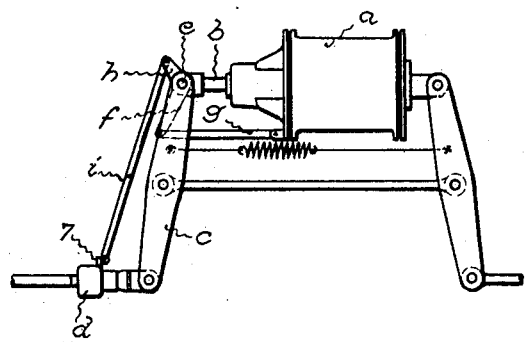
Figs. 5 and 6 show the mounting of the apparatus according to Figs. 1 and 4, respectively.

According to Figs. 1–3 the reference numeral 1 represents the adjuster rod or spindle and 2 the driven member of the one-way driving device rigidly connected with said spindle. At one end, the spindle 1 is provided with a head 3 preferably mounted within a cavity in a housing 4 forming a part of the connection eye by means of which the spindle or rod including the slack adjuster is connected with the brake rigging. Between the head 3 and an abutment within the housing 4 is interposed a rather strong spring 5 acting in opposition to the stress arising in the apparatus when braking. On the housing, and also on the spindle 1, is freely rotatably mounted a protection sleeve 6 surrounding the mechanism and provided with a crank member 7 by means of which the sleeve 6 may be turned by influence from an actuating member connected with a movable part of the brake rigging, so that the sleeve is turned a certain angle in one direction when applying the brakes, and back again when releasing the same.

The parts of the apparatus described above are to be considered as previously known and form themselves no part of the invention.

In the embodiment according to Fig. 1 the turning movement of the sleeve 6 in one direction is assumed to be transmitted to the adjuster rod or spindle 1 by means of the member 2 which has the form of a ratchet wheel and coacts with a pawl 8 pivotally mounted in a bearing lug rigidly connected with the sleeve 6 within the interior of the same. This pawl 8 and the associated ratchet wheel 2 are constructed in such a manner that the turning of the ratchet wheel is effected when rotating the sleeve 6 in one direction only, the rotation of the sleeve in the opposite direction being a dead or idle motion. The pawl 8 coacts with a lever 9 which is hingedly connected with the interior of the sleeve 6 and provided with a transverse abutment pin 10 extending from the end of lever 9 and positioned behind the pawl. The lever 9 is also provided with a cam surface at 11 contacting with a ring-shaped collar 12 on the spindle 1, and one or more springs $8^a$ may be arranged in a suitable manner so as normally to keep the pawl 8 engaged with the ratchet wheel 2.

Under the condition that the inter-distance between the brake shoes and the wheels is too large, the performance of a braking action will at first cause a turning movement of the sleeve 6, and said sleeve, by the intermediary of the pawl and ratchet mechanism, transmits the turning movement to the adjuster rod or spindle 1, until a certain amount of stress arises in the brake rigging such as will overcome the spring 5 and compress the same, so that the spindle 1 and the parts affixed thereto will be longitudinally displaced in relation to the other parts of the apparatus. The collar 12, by means of the cam surface 11, will then press back the lever 9, and the pin 10 thereon will release the pawl 8 from engagement with the ratchet wheel 2, whereupon the continued turning movement of the sleeve 6 will have no further influence on the adjuster mechanism.

In the embodiment according to Fig. 2 corresponding reference numerals are used on similar parts, as aforesaid, and the action of this apparatus will be understood without further description or explanation. The only difference is that for the ratchet wheel 2 there is substituted a smooth flange $2^a$ coacting with one or more friction pawls 13 pivotally mounted on fixed lugs within the sleeve 6, such friction pawls being each provided with an eccentric working surface for coaction with the flange $2^a$. Also in this case the pawl or pawls 13 may be acted upon by one or more springs (not shown) for keeping them permanently in contact with the said flange.

The manner of action of this embodiment is the same as described above, and when the predetermined amount of stress arises when braking, the flange $2^a$ will be longitudinally displaced in relation to the pawl or pawls 13, so that the working surface of the latter rolls on the surface of the flange and releases the flange in the manner indicated in the fragmentary view shown in Fig. $2^a$, whereby the friction pawl device will, of course, loose its driving power.

In the embodiment according to Fig. 3, the driven member of the driving device is constructed substantially in the same manner as in Fig. 1, i. e. in the form of a ratchet wheel $2^b$, and provided with teeth inclined in one direction only. In this instance the driving member of said device consists of another ratchet wheel 14 substantially of the same kind as the wheel $2^b$. The wheel 14 is freely rotatable around the spindle 1 and coupled to the sleeve 6 by means adapted for inducing said wheel to take part in the rotation of the sleeve but permitting it to be axially displaced in relation thereto, so as to permit the ratchet teeth to slide over each other at the backward rotation of the wheel 14. According to the embodiment shown, said last-mentioned means consists of lugs 15 extending radially from the wheel 14 into corresponding grooves 16 provided in the inner surface of the sleeve 6 and extending substantially in the direction of length of the latter. The ends of the grooves 16 nearest to the ratchet wheel $2^b$ form abutment surfaces 17 limiting the displacement of the ratchet wheel 14 towards the left in the drawing, the limit being reached when the wheels are fully in engagement with each other and corresponds to a release position of the brakes.

The manner of action of this embodiment is substantially the same as described above, and when a sufficient stress is reached during braking the wheel $2^b$ will be pulled out of engagement with the wheel 14, which latter, by means of the abutments 17, is prevented from following the former although acted upon by an engagement spring 18. At the turning movement of the sleeve 6 in the opposite direction (when releasing the brakes), the teeth on the two wheels will slide backwardly on each other without any rotating movement being transmitted from the wheel 14 to the wheel $2^b$.

In the embodiment according to Fig. 4, the adjuster rod $1^a$ is itself toothed, and without being turned it may be longitudinally displaced by means of a pawl 26 mounted pivotally on a lever 19 the free end of which is provided with a cam member 20. The lever 19 is pivotally mounted in a housing 21 surrounding the toothed rod $1^a$ and provided with a locking pawl 22 which also engages said rod. Between an abutment 23 provided on a tubular member 24 surrounding the rod $1^a$ and a corresponding abutment 25 on the housing 21 is interposed an expansion spring 5, and a part connected with the tube 24, for instance the abutment 23, forms a cam surface for coaction with the cam member 20 in order to lift the same. A further abutment 27 is formed on the tube 24 for coaction with the abutment 25.

The manner of action of this embodiment is as follows:—

The adjusting movement in a suitable manner is transmitted to the pawl member 26, in correspondence with the rocking movement transmitted to the crank member 7 described above, and thereby said pawl displaces the toothed rod 1ª longitudinally in relation to the housing 21. When a sufficient stress has grown up in the brake rigging, the spring 5 will be compressed, and the abutment 23 moves to the right in the drawing, whereby the cam surface on the same acts upon the cam member 20 so as to tilt the lever 19 and to raise the pawl 26 out of engagement with the toothed rod 1ª. The braking stress is then transmitted from the tube 24 to the rod member 1ª by the intermediary of the abutments 27 and 25, the housing 21 and the pawl 22.

Figure 6:
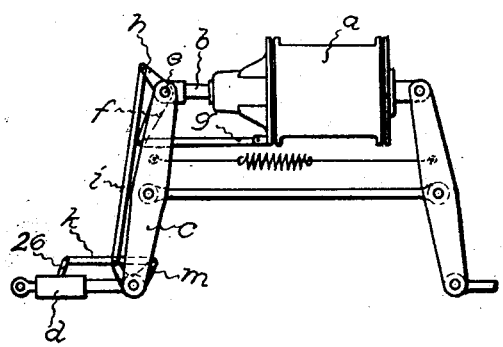

As to Figs. 5 and 6, these figures, as already stated, show the mounting of the apparatus in connection with Figs. 1 and 4, respectively. Thus, in Fig. 5, $a$ indicates the brake cylinder and $b$ the piston rod; $c$ is the piston rod brake lever and $d$ the slack adjuster, which latter is to be actuated by the crank 7. The piston rod head bolt $e$ carries a bell-crank lever, one arm $f$ of which, by means of a link $g$, is connected with a fixed point on the car frame, while the other arm $h$ of the bell-crank lever is connected by means of a link $i$ with the crank member 7. Now, when the piston rod $b$ moves to the left during braking, the bell-crank lever $f$—$h$ will turn about the bolt $e$, and by means of the link $i$, it will cause a tilting movement in the direction of the crank member 7; and when the piston rod moves back again, in a corresponding manner the crank member 7 will be tilted in the opposite direction.

In Fig. 6, the same reference characters are used on corresponding parts of construction, and the figure shows the arrangement in connection with the embodiment of the apparatus shown in Fig. 4. The slack adjuster is indicated at $d$ and is provided with the pawl 26, as described. The outer end of said pawl is connected by means of a link $k$ with a bell-crank lever $m$ which is also connected with the link $i$. When the piston rod $b$ moves to the left during braking, the bell-crank lever $f$—$h$ is turned in the same manner as described above, and then it turns the bell-crank lever $m$, and the latter tilts the pawl 26 around its pivot in a counter-clockwise direction. When the brake is released, the pawl will naturally be tilted a corresponding angle in the opposite direction, and such movements of the pawl perform the adjustment of the slack in the manner described.

What I claim and desire to secure by Letters Patent is:—

1. An automatic slack adjuster for brakes on railway cars and the like, comprising a one-way driving device, an adjuster rod associated therewith and displaceable in its direction of length, spring means counteracting such displacement when the stress arising in the brake rigging during braking overcomes the resistance of said spring means, characterized in that the driving and driven members of the driving device, are releasably connected with each other in such a manner that they are disengaged when the stress arising in the brake rigging during braking exceeds the value at which the longitudinal displacement of the adjuster rod takes place.

2. An automatic slack adjuster for brakes on railway cars and the like, comprising a movable adjuster rod, a one-way driving device for effecting the adjusting movement of said rod, spring means acting upon said rod in counter-action to the stress arising in the same during braking, means for permitting longitudinal displacement of the rod when the braking stress overcomes said spring means, a releasable connection between the driving and driven members of the driving device, and means for releasing such connection when the stress arising in the brake rigging during braking exceeds the value at which the longitudinal displacement of the adjuster rod takes place against the counter-action of the spring means.

3. An automatic slack adjuster for brakes on railway cars and the like, comprising a movable adjuster spindle rotatable to effect its adjusting movement, one-way driving device for turning said spindle, spring means acting upon the adjuster spindle in counter-action to the stress arising in the same during braking, means for permitting longitudinal displacement of the spindle when the braking stress overcomes said spring means, a releasable connection between the driving and driven members of the driving device, and means for releasing such connection when the stress arising in the brake rigging during braking exceeds the value at which the longitudinal displacement of the adjuster spindle takes place against the counteraction of the spring means.

In testimony whereof I have signed my name to this specification.

BERT HENRY BROWALL.